(12) United States Patent
Katchmart et al.

(10) Patent No.: US 7,773,328 B1
(45) Date of Patent: Aug. 10, 2010

(54) SYNCHRONOUS REPEATABLE RUN OUT FIELD DETECTION WITH HIGH EFFICIENCY FIELD FORMAT

(75) Inventors: Supaket Katchmart, Campbell, CA (US); Henri Sutioso, San Jose, CA (US); Pantas Sutardja, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 385 days.

(21) Appl. No.: 12/009,096

(22) Filed: Jan. 16, 2008

Related U.S. Application Data

(60) Provisional application No. 60/885,118, filed on Jan. 16, 2007.

(51) Int. Cl.
*G11B 5/09* (2006.01)
(52) U.S. Cl. .................. 360/51; 360/77.04; 360/31
(58) Field of Classification Search .................. None
See application file for complete search history.

(56) References Cited

U.S. PATENT DOCUMENTS

| | | | |
|---|---|---|---|
| 6,765,748 B2 * | 7/2004 | Shu | 360/77.04 |
| 7,199,959 B1 * | 4/2007 | Bryant | 360/51 |
| 7,542,230 B1 * | 6/2009 | Melrose et al. | 360/77.04 |

OTHER PUBLICATIONS

Pending U.S. Appl. No. 11/541,994 "Synchronous RRO Write"; filed Oct. 2, 2006; Supaket Katchmart; 51 pages.
Intersymbol interference from Wikipedia, the free encyclopedia; http://en.wikipedia.org/wiki/Intersymbol_interference; May 11, 2007; 2 pages.
Euclidean distance from Wikipedia, the free encyclopedia; http://en.wikipedia.org/wiki/Euclidean_distance; May 11, 2007; 3 pages.
Viterbi algorithm from Wikipedia, the free encyclopedia; http://en.wikipedia.org/wiki/Viterbi_algorithm; May 11, 2007; 6 pages.
Viterbi decoder from Wikipedia, the free encyclopedia; http://en.wikipedia.org/wiki/Viterbi_decoder; May 11, 2007; 6 pages.

* cited by examiner

*Primary Examiner*—Jason C Olson

(57) ABSTRACT

A hard disk control system comprises a phase adjust module, an offset adjust module, and a read/write timing module. The phase adjust module generates a phase adjust signal based on a phase difference between a first repeatable run out (RRO) field and a servo wedge field. The offset adjust module outputs a position calibration pattern to a storage medium based on the phase adjust signal; receives at least a portion of the position calibration pattern from the storage medium; and determines an offset based on a comparison between the output position calibration pattern and the received portion of the position calibration pattern. The read/write timing module determines a position to write a second RRO field on the storage medium based on the offset.

27 Claims, 12 Drawing Sheets

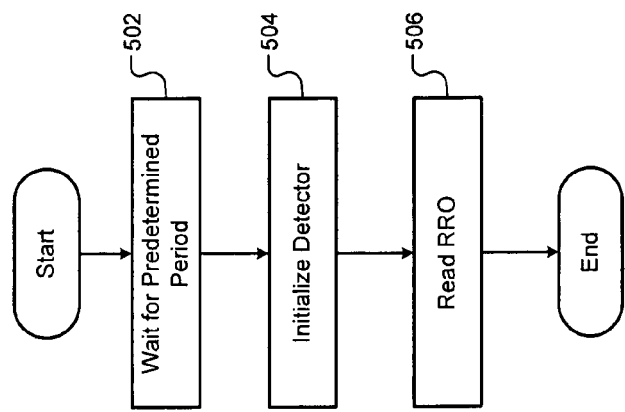
FIG. 10C
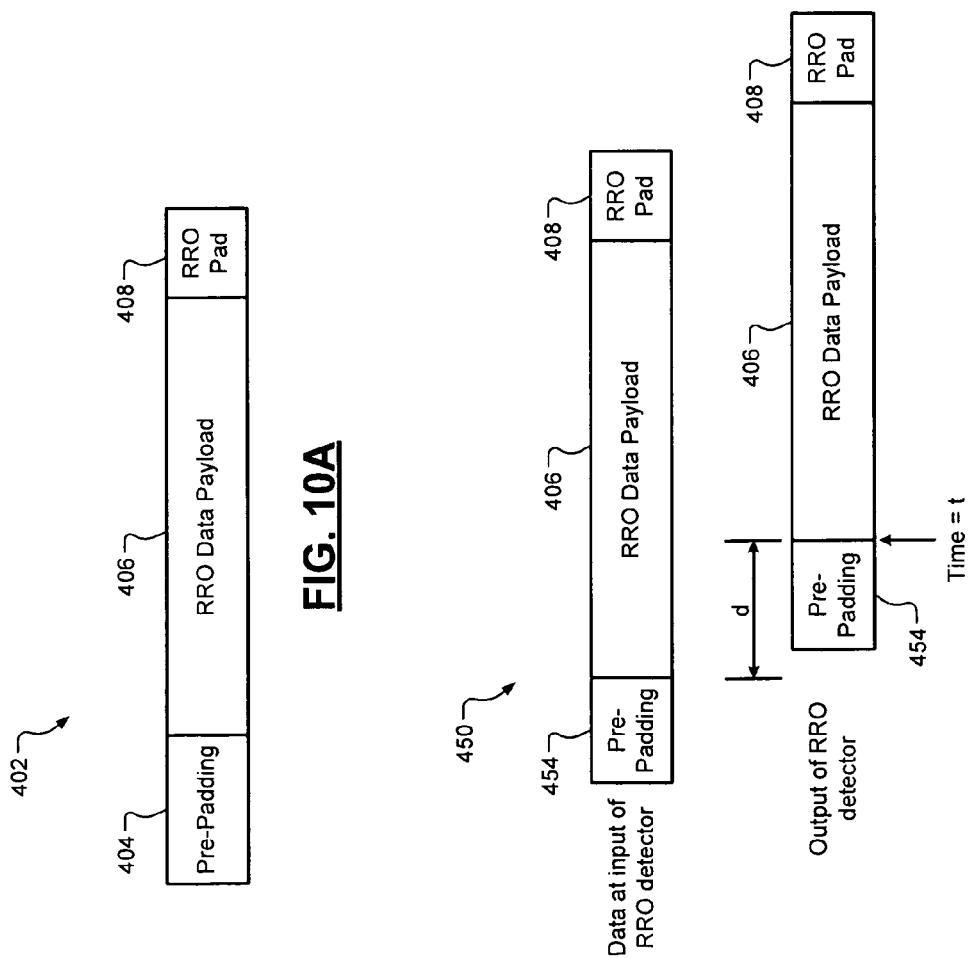
FIG. 10A
FIG. 10B

SYNCHRONOUS REPEATABLE RUN OUT FIELD DETECTION WITH HIGH EFFICIENCY FIELD FORMAT

CROSS-REFERENCE TO RELATED APPLICATIONS

This application claims the benefit of U.S. Provisional Application No. 60/885,118, filed on Jan. 16, 2007, which is incorporated herein by reference in its entirety.

FIELD

The present disclosure relates to data processing, and more particularly to systems and methods for writing a repeatable run out field.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A hard disk drive (HDD) control system typically positions a read/write head over a disk medium by locking a servo loop to a predetermined servo positioning pattern (or servo wedge). FIG. 1 illustrates an example servo wedge 21. The servo wedge 21 includes a preamble field 22, a servo sync-mark (SSM) field 24, a track/sector identification (ID) field 26, and a plurality of position error signal (PES) fields 28-1, 28-2, ..., 28-N (referred to collectively as PES fields 28). The servo wedge 21 further includes a plurality of repeatable run out (RRO) fields 30-1, 30-2, ..., 30-M (referred to collectively as RRO fields 30). The RRO fields 30 generally provide head positioning information to compensate for RRO disturbance of a hard disk drive.

Typically, an acquisition pattern is recorded in the preamble field 22. The acquisition pattern enables a read/write channel within an HDD to acquire appropriate timing and amplitude information from a read signal before reading servo information. The preamble field 22 is used to lock a servo timing loop's clock phase and frequency to a servo wedge and synchronize servo information stored in the servo track/sector ID field 26. The SSM 24 is used to mark the ending point of the preamble field 22 and the starting point of the track/sector ID FIELD 26. The SSM 24 is also used as a reference point for the position of other data payloads throughout servo fields.

The track/sector ID field 26 indicates both a circumferential position and a coarse radial position of the head. The track/sector ID field 26 typically includes a servo track number that identifies a current track that the head is over while the head is seeking to a selected track. The track/sector ID field 26 further includes sector identification data used to identify data sectors of the tracks.

The position information included in a servo field is generally used to determine a fine position of the head on the disk surface and to provide an HDD control system an instantaneous position error signal. The PES fields 28 provide information concerning fine radial positioning of the head. The servo system may compare the relative signal strengths of various PES fields to determine the fine position of the head on the disk surface.

Conventionally, the RRO fields 30 are stored on the disk itself. An exemplary storage method embeds the RRO fields 30 within the servo wedge 21. The preamble field 22, SSM 24, track/sector ID FIELD 26, and PES FIELD 28 fields may be written at the same time. Hence, these fields are generally phase coherent (i.e. minimal phase shift is present between the fields). The RRO fields 30 are typically written at a different time due to various requirements of calibration techniques used in HDD manufacturing processes. Unavoidable circuit latency and physical structure of the disk drive read/write head can cause written RRO fields 30 to have a phase offset with respect to the servo preamble field 22, SSM 24, and PES fields 28. RRO field detectors may be sensitive to such phase offset, and, therefore, RRO field detection may be degraded if phase offset is present.

Referring to FIG. 2, an exemplary relationship between detector bit error rate and phase offset is shown. Phase offset can cause detector performance degradation since more error bits will be present in detected data. A small phase offset, even when significantly less than one user bit, can dramatically increase bit error rate. For example, the phase shift indicated at 31 results in a bit error rate approaching 100%.

Referring back to FIG. 1, phase offset due to RRO writes may require each RRO field 30 to have an RRO preamble 33. The RRO preamble 33 is used to adjust the phase of the detector to allow for reliable reading of remaining portions of the RRO field. Further, the RRO preamble 33 may be used to bring the detector to a known state after the detector receives unknown values from an unwritten portion of the disk medium (or magnetic medium) after the final PES field 28-N and before the RRO preamble 33. An RRO sync-mark (RROSM) 34 is placed after the RRO preamble 33 to act as a reference point for the position of an RRO data payload 35. An RRO pad 36 is used to manage intersymbol interference (i.e. the interference between the current bit and previously read channel bits).

The acquisition of previously written data in a system with intersymbol interference may be described by the following equation:

$$y(n) = \sum_{i=0}^{m} c(i) \times x(n-i)$$

where y(n) represents an acquired signal, x(n) represents previously written data, and c(i) represents a channel coefficient that weights the written data according to an amount of intersymbol interference. The effect of the unwritten portion of the magnetic medium, between the final PES field 28-N and the first RRO field 30-1, is also described by the equation. Assuming that x(0) to x(n) represents written data, the value of x(k) for k<0 represents the unwritten portion of the magnetic medium containing unknown values. The values of y(0) to y(m−1) are therefore unknown. Consequently, the written data from x(0) to x(m−1) is not accurately retrievable.

Referring to FIG. 3, a five-bit sequence 40, such as may be included in one of the RRO fields of the servo wedge 21, is shown. The five-bit sequence includes five user bits 42, each separated by a boundary, such as that shown at 44. Each of the user bits 42 may include multiple channel bits. For example, the fourth user bit is shown with four channel bits a, b, c, d, where channel bit b is indicated at 46. Each channel bit 46 may represent sampled analog data obtained from the magnetic medium. Phase offset may be measured in units of user bits 42 and/or channel bits 46.

Referring to FIGS. 4A-4C, various detection scenarios are possible when an RRO detector acquires RRO data. A portion of an RRO field, including five user bits 42, is shown for each scenario. Referring to FIG. 4A, the RRO detector may be out of phase with the RRO field, which may result in a high bit error rate. The phase error is indicated at 50. The RRO preamble 33 is added to mitigate this problem. The RRO preamble 33 may include a sinusoidal waveform, which may be formed from alternating 1's and 0's, to provide a reliable phase reference. The typical length of the RRO preamble is 6 to 12 user bits.

Referring to FIG. 4B, the RRO detector is shown adapting to the phase of the RRO field. At reference numeral 52, the RRO detector has aligned its phase with the bit boundaries of the RRO field. In addition, there is no position offset between the RRO field and the RRO detector. In other words, the RRO detector reads bit 4 as bit 4 and bit 5 as bit 5.

However, as shown in FIG. 4C, a position offset may be present after phase adjustment has been completed. At 54, the phase of the RRO detector is aligned with the bit boundaries of the RRO field. However, bit 5 will be read as bit 4, bit 6 will be read as bit 5, etc. Depending on the phase alignment process, even greater position offsets may be possible.

To allow the RRO detector to eliminate position offset, the RRO sync mark (RROSM) 34, a predetermined bit sequence, is added. When the RRO detector finds that bit sequence, the RRO detector will have established the position from where data is being read. RRO data, such as the RRO data payload 35, can then follow the RROSM 34. The RRO detector may be programmed to interpret the data immediately following the RROSM 34 as the RRO data payload 35. The typical length of the RROSM 34 is 2-7 user bits. The RRO preamble 33 and the RROSM 34 therefore allow the RRO detector to correct for phase offset and then for position offset. An RRO pad 36 may be added to the end of the RRO data payload 35 to mitigate intersymbol interference.

Referring to FIG. 5, a flow diagram illustrates steps performed in removing phase offset and positional offset. Control begins in step 60, where phase adaptation is performed. After phase adaptation is complete, or after a predetermined period of time, control continues in step 62. The predetermined period of time may correspond to an upper limit of time needed to successfully perform phase adaptation.

In step 62, a timer is started. Control continues in step 64, where control begins to look for the sync-mark bit pattern. Control continues in step 66, where control determines whether the sync-mark has been found. If so, control transfers to step 68; otherwise, control transfers to step 70. In step 68, the RRO payload is read immediately following the sync-mark. Control then ends. In step 70, control determines whether the timer has expired. If so, control ends; otherwise, control returns to step 64 to continue looking for the sync-mark.

SUMMARY

A hard disk control system comprises a phase adjust module, an offset adjust module, and a read/write timing module. The phase adjust module generates a phase adjust signal based on a phase difference between a first repeatable run out (RRO) field and a servo wedge field. The offset adjust module outputs a position calibration pattern to a storage medium based on the phase adjust signal; receives at least a portion of the position calibration pattern from the storage medium; and determines an offset based on a comparison between the output position calibration pattern and the received portion of the position calibration pattern. The read/write timing module determines a position to write a second RRO field on the storage medium based on the offset.

In other features, the read/write timing module reads the second RRO field at the position on the storage medium at which the second RRO field is written. The read/write timing module reads the second RRO field at the position on the storage medium without use of an RRO sync mark (RROSM). The position calibration pattern comprises a preamble followed by a non-repetitive bit pattern.

In further features, the calibration pattern comprises a preamble followed by an RRO sync mark (RROSM). The offset has a resolution of at least one of user bits and channel bits. The position on the storage medium at which the second RRO field is written is based on an amplitude and angle data associated with the servo wedge field. The second RRO field comprises at least one of a pre-padding field, an RRO data payload field, and an RRO pad field. The hard disk control system further comprises a digital decoder to determine digital data from sampled analog values read from the storage medium. The digital decoder is initialized to a known state at a predetermined time based on a reading time of the second RRO field.

In still other features, the second RRO field includes a payload, a single pre-padding bit, and a single post-padding bit. The second RRO field includes a payload beginning with a first bit. The predetermined time is determined based on a latency of the digital decoder and on a first time when the first bit is output from the digital decoder and on a delay. The predetermined time is based on the first time minus the latency. The offset adjust module outputs the position calibration pattern to the storage medium in phase with the servo wedge field.

A method for controlling a hard drive system comprises generating a phase adjust signal based on a phase difference between a first repeatable run out (RRO) field and a servo wedge field; outputting a position calibration pattern to a storage medium based on the phase adjust signal; receiving at least a portion of the position calibration pattern from the storage medium; determining an offset based on a comparison of the position calibration pattern to the received portion of the position calibration pattern; and determining an adjusted position at which to write a second RRO field on the storage medium based on the offset.

In further features, the method further comprises reading the second RRO field at the adjusted position. The method further comprises reading the second RRO field at the adjusted position without use of an RRO sync mark (RROSM). The position calibration pattern comprises a preamble followed by a non-repetitive bit pattern.

In other features, the calibration pattern comprises a preamble followed by an RRO sync mark (RROSM). The offset has a resolution of at least one of user bits and channel bits. The method further comprises determining the adjusted position based on amplitude and angle data associated with the servo wedge field. The second RRO field comprises at least one of a pre-padding field, an RRO data payload field, and a padding field. The method further comprises determining digital data from sampled analog values read from the storage medium; and initializing the digital data determining to a known state at a predetermined time based on a reading time of the second RRO field.

In still other features, the second RRO field includes a payload and a single pre-padding bit. The second RRO field includes a payload, a single pre-padding bit, and a single post-padding bit. The second RRO field includes a payload beginning with a first bit. The predetermined time is determined based on a latency of the digital data determining and on a first time when the first bit is output from the digital data determining. The predetermined time is based on the first time minus the latency. The method further comprises outputting the position calibration pattern to the storage medium in phase with the servo wedge field.

Further areas of applicability of the present disclosure will become apparent from the detailed description provided hereinafter. The detailed description and specific examples are intended for purposes of illustration only and are not intended to limit the scope of the disclosure.

BRIEF DESCRIPTION OF THE DRAWINGS

FIG. 10A illustrates an RRO field for use with a position-adjusted system according to one implementation of the present disclosure.

FIG. 10B illustrates the latency of a digital detector as an RRO field is read according to one implementation of the present disclosure.

FIG. 10C is a flow diagram illustrating a position-adjusted reading method with detector initialization forcing according to one implementation of the present disclosure.

DETAILED DESCRIPTION

Figure 1:
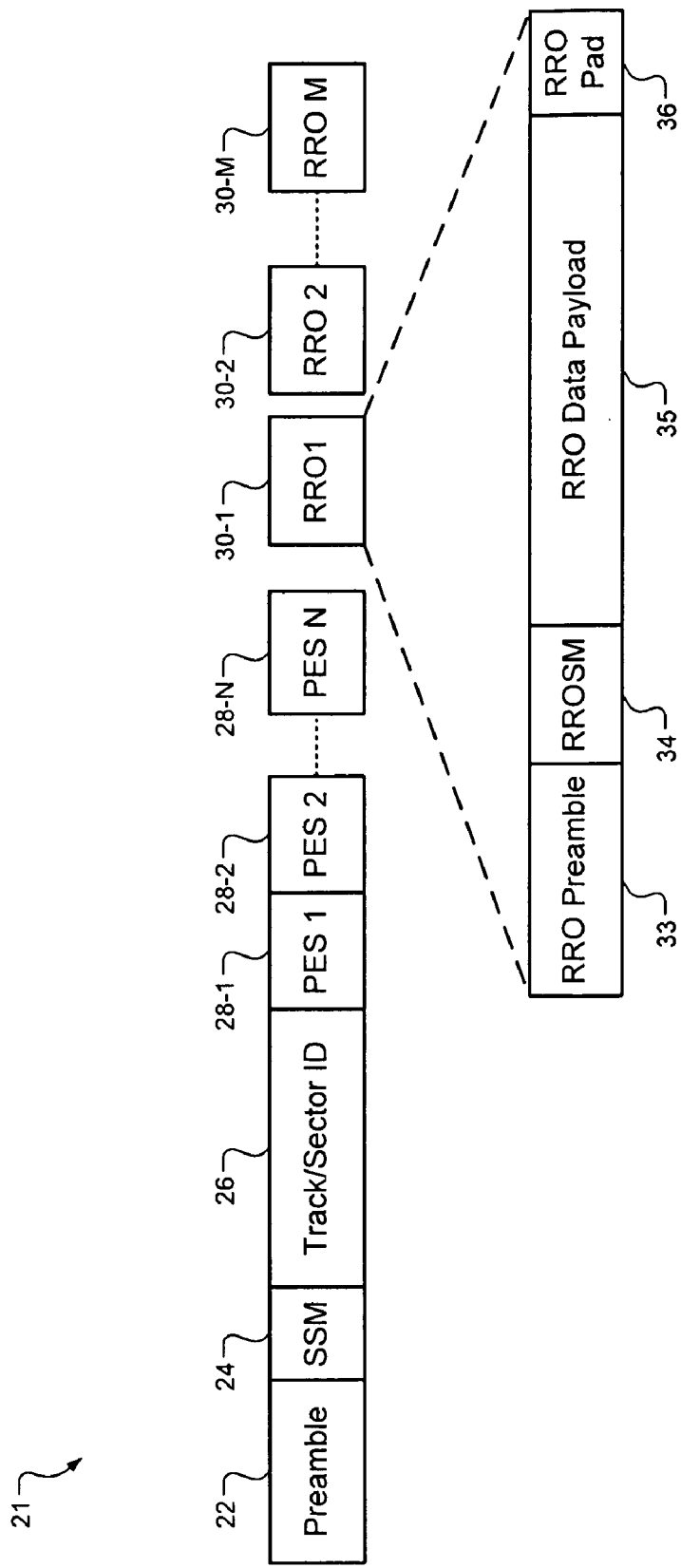
FIG. 1 illustrates a servo wedge according to the prior art.
Figure 2:
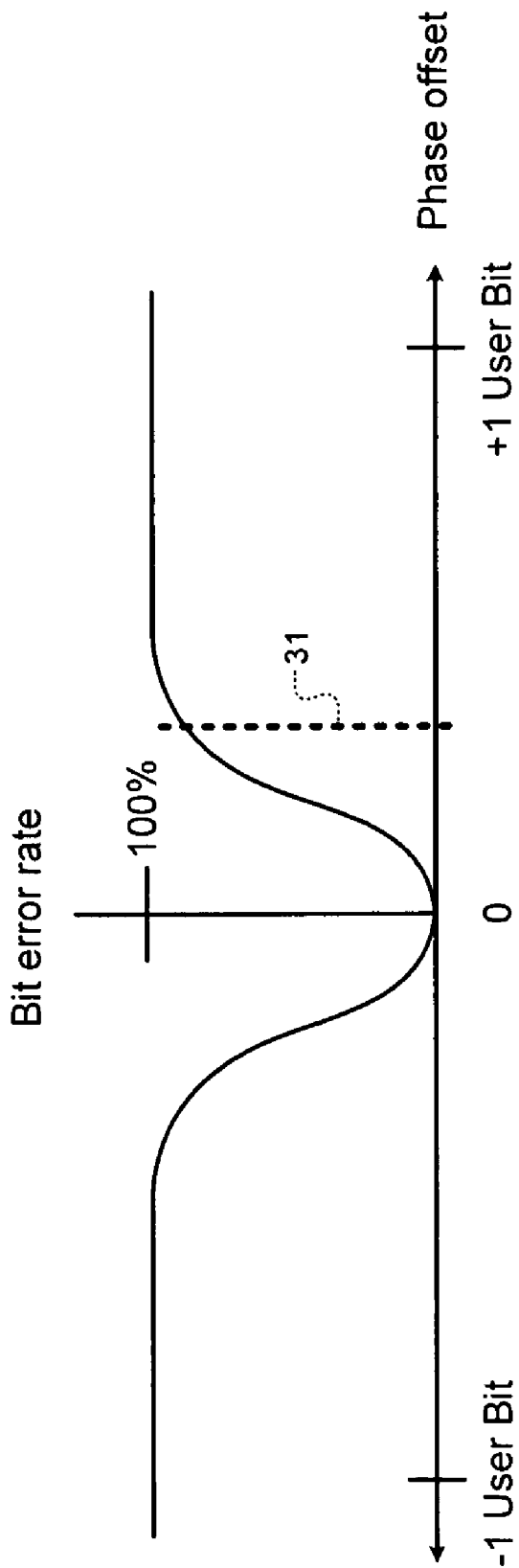
FIG. 2 is a graph showing a relationship between bit error rate and reading phase offset according to the prior art.
Figure 3:
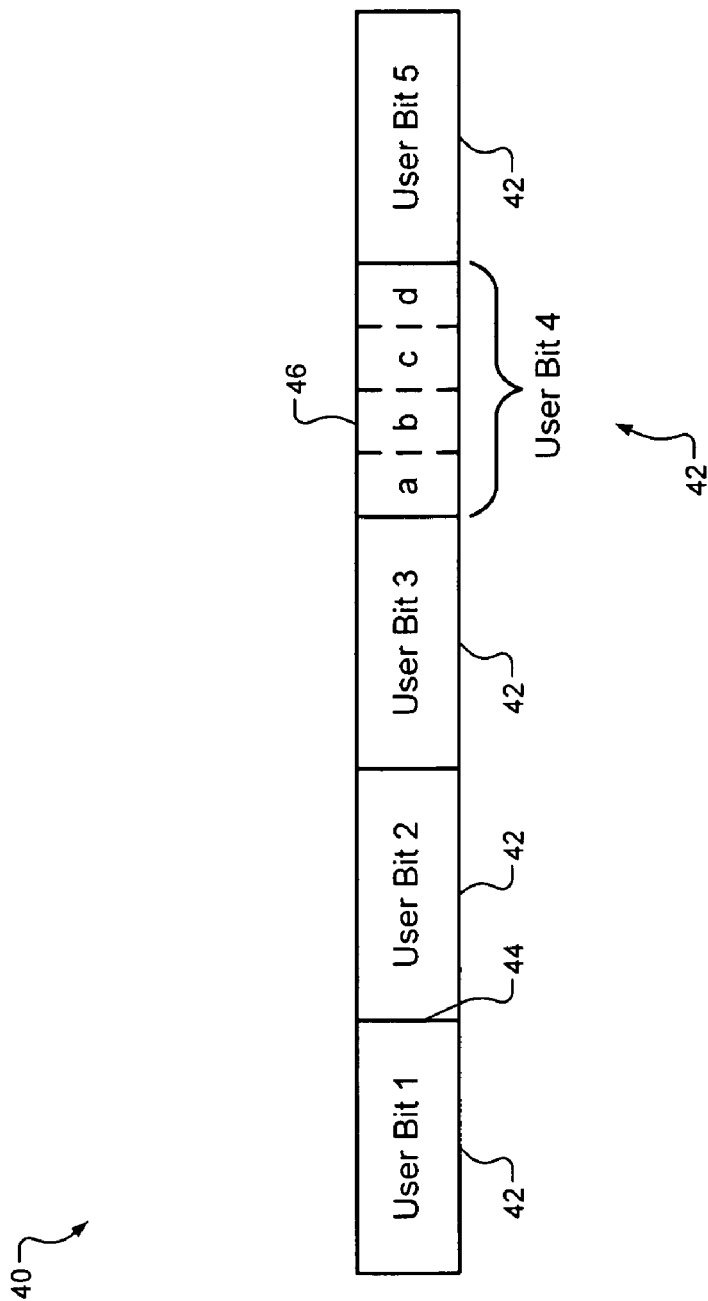
FIG. 3 illustrates exemplary user bits in the servo wedge of FIG. 1 according to the prior art.

The following description is merely exemplary in nature and is not intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs or subroutines, a combinational logic circuit, and/or other suitable components that provide the described functionality.

Typically, a repeatable run out (RRO) field is not phase coherent with other fields of a servo wedge because the RRO field is written at a different time than the other fields. A phase-adjusted RRO system according to one implementation of the present disclosure writes a phase-adjusted RRO field that is phase coherent with the other fields of the servo wedge. Phase-adjusted may mean that the user bit boundary is properly aligned to an ideal user bit framing boundary. The size of the RRO field may therefore be reduced in a phase-adjusted system because the system does not need the RRO preamble in order to remove phase offset.

Although phase offset is mitigated by phase-adjusted writing, a position offset may still be present. In other words, while the user bit boundaries are aligned, the bit being read may be shifted from its expected position by increments of full user bits. By writing a non-repetitive test pattern that is phase-adjusted, and then attempting to read the test pattern, the position offset can be determined.

Alternatively, a pattern including an RROSM, such as a dummy RRO field, may be written. Upon reading, the difference between the position at which the RROSM is found, and where it was expected, is the position offset. Once the position offset has been determined, it can be removed when actual data is written, resulting in position-adjusted data. Performing position adjustment may imply that phase adjustment has already been performed.

Even with phase and position offsets removed, a multiple-bit pad having known values may be prepended to the RRO payload to mitigate intersymbol interference (ISI). The digital decoder in the RRO decoder may produce an output based on the current bit being read as well as previously read bits. The pad is used to initialize the digital decoder with known values.

If the precise time at which the digital decoder will begin receiving valid data can be determined, the digital decoder may be forced into a known state immediately prior to that time. Then, a single bit having a known value could be used at the beginning of the RRO field. This single bit provides the only initialization needed for the digital decoder, after it had been forced into a known state. In one implementation, the single bit may be eliminated. Another single pad bit may follow the payload. An optimized RRO field may then include an RRO prepadding bit, an RRO data payload, and an RRO padding bit. This RRO field can be read without separate timing (phase) acquisition or starting point (position) detection.

These changes allow the RRO field to have a greater storage efficiency than fields according to the prior art. For example, according to the prior art, an RRO field with an 8-bit payload may have used a 12-bit preamble, a 7-bit sync-mark, and a 1-bit pad. This results in an efficiency of 29% (8/28). By contrast, an RRO field according to one implementation of the present disclosure may have an 8-bit payload, with a single padding bit before and after the payload. This results in an efficiency of 80% (8/10).

Figure 6:
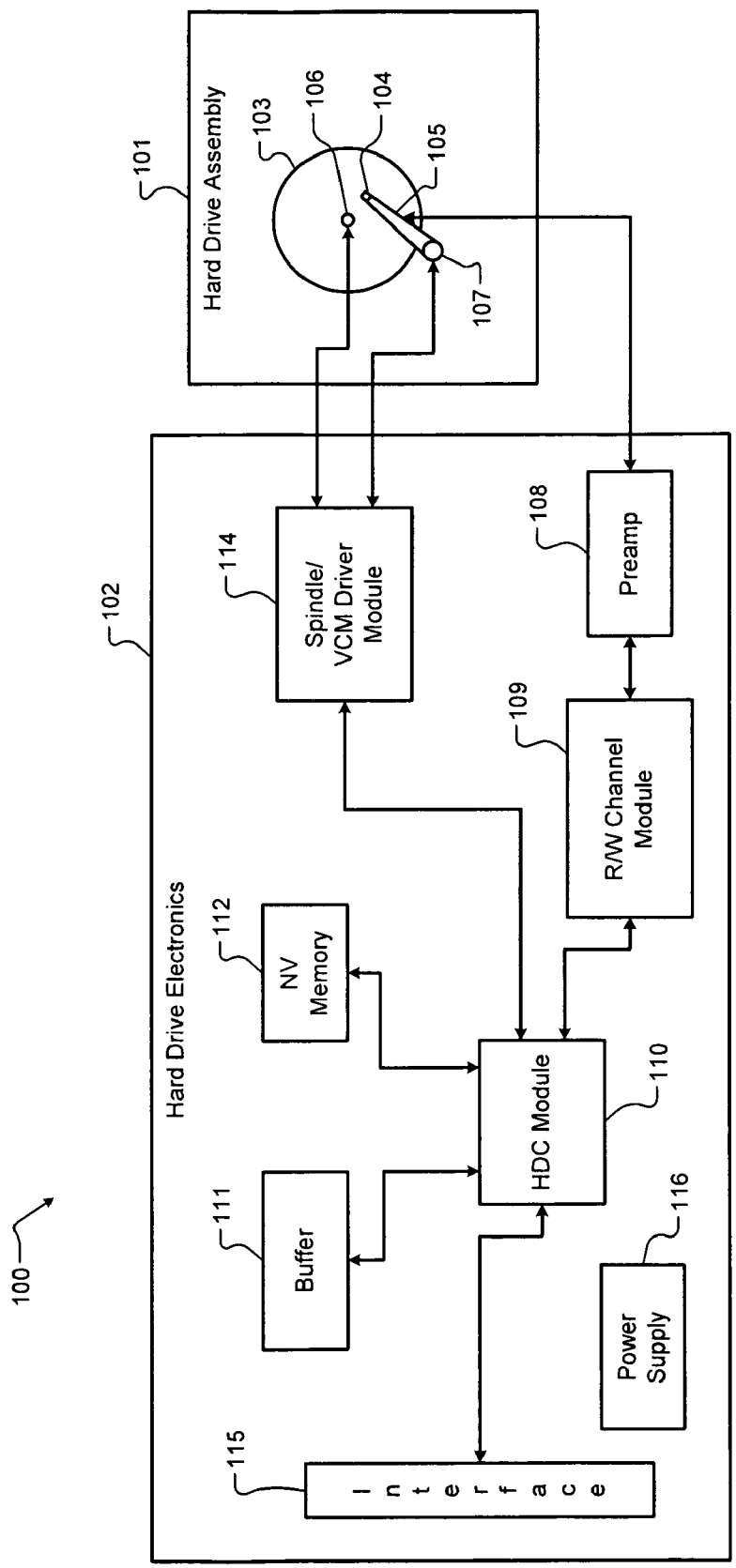
FIG. 6 is a functional block diagram of a hard disk drive according to one implementation of the present disclosure.

Referring now to FIG. 6, a position calibrated RRO system according to one implementation of the present disclosure may be implemented in a hard disk drive (HDD) 100. In one implementation, the HDD 100 includes a hard drive assembly (HDA) 101 and a hard drive electronics system 102. The HDA 101 may include a magnetic medium 103, e.g., one or more platters that store data, and a read/write device 104.

The read/write device 104 may be arranged on an actuator arm 105 and may read and write data on the magnetic medium 103. Additionally, in one implementation, the HDA 101 includes a spindle motor 106 that rotates the magnetic medium 103 and a voice-coil motor (VCM) 107 that actuates the actuator arm 105.

In one implementation, the hard drive electronics system 102 includes a preamplifier 108. The preamplifier 108 amplifies signals generated by the read/write device 104 during read operations and provides signals to the read/write device 104 during write operations. In one implementation, the hard drive electronics system 102 also includes a read/write (R/W) channel module 109, a hard disk controller (HDC) module 110, a buffer 111, nonvolatile memory 112, and a spindle/VCM driver module 114.

The R/W channel module 109 processes data received from and transmitted to the preamplifier 108. The HDC module 110 controls components of the HDA 101 and communicates with an external device (not shown) via an I/O interface 115. The external device may include a computer, a multimedia device, a mobile computing device, etc. The I/O interface 115 may include wireline and/or wireless communication links.

The HDC module 110 may receive data from the HDA 101, the R/W channel module 109, the buffer 111, nonvolatile memory 112, the spindle/VCM driver module 114, and/or the I/O interface 115. The HDC module 110 may process the data, including encoding, decoding, filtering, and/or formatting the data. The processed data may be output to the HDA 101, the R/W channel module 109, the buffer 111, nonvolatile memory 112, the spindle/VCM driver module 114, and/or the I/O interface 115.

The HDC module 110 may use the buffer 111 and/or nonvolatile memory 112 to store data related to the control and operation of the HDD 100. The buffer 111 may include DRAM, SDRAM, etc. Nonvolatile memory 112 may include any suitable type of semiconductor or solid-state memory, such as flash memory (including NAND and NOR flash memory), phase change memory, magnetic RAM, and multi-state memory (in which each memory cell has more than two states). The spindle/VCM driver module 114 controls the spindle motor 106 and the VCM 107. In one implementation, the hard drive electronics system 102 includes a power supply 116 that provides power to the components of the HDD 100.

Figure 7A:
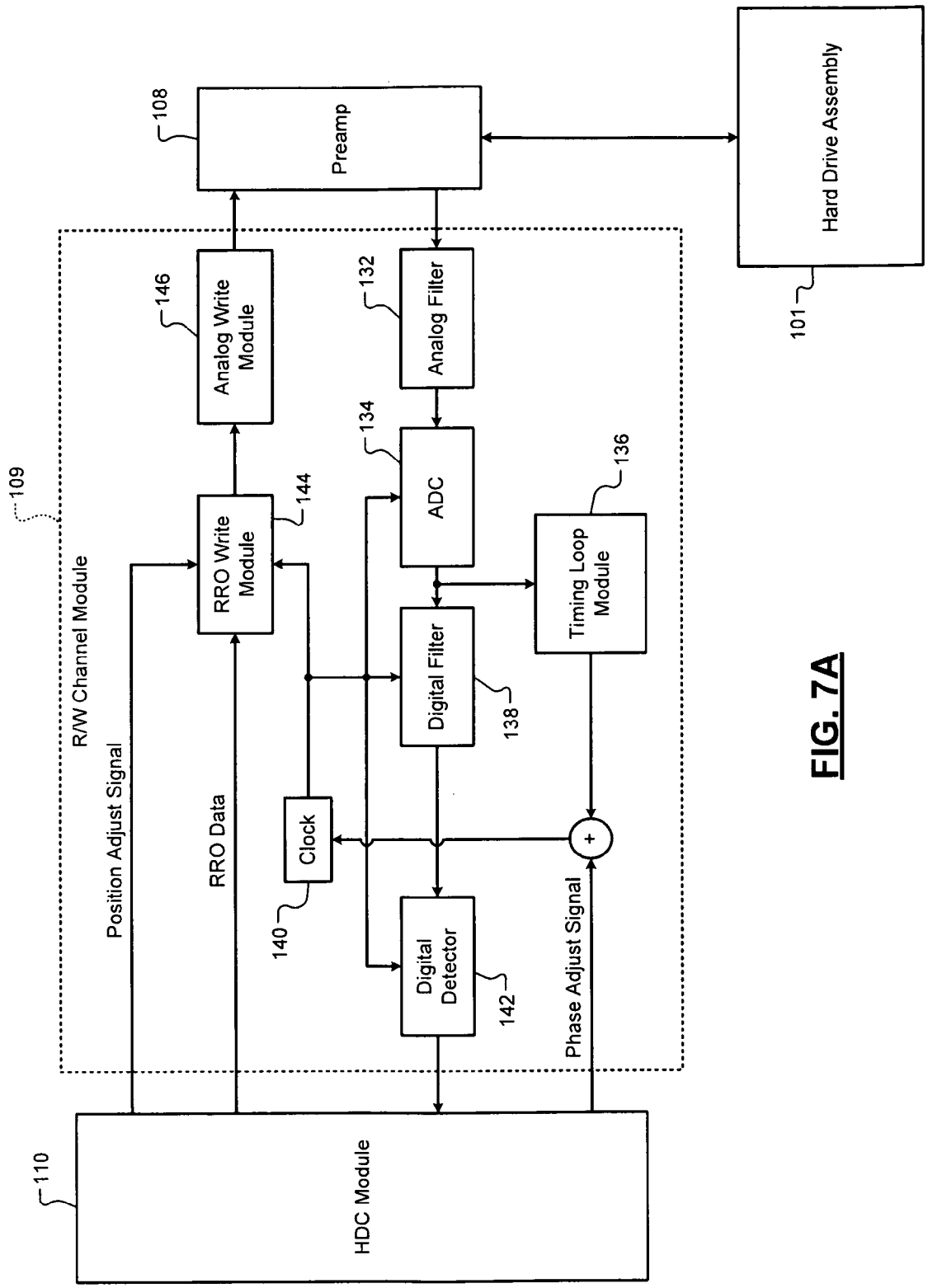
FIG. 7A is a functional block diagram of the read/write channel according to one implementation of the present disclosure.

FIG. 7A shows one implementation of the R/W channel module 109. In general, the R/W channel module 109 reads data from and writes data to the HDA 101. The R/W channel module 109 may include an analog filter 132, an analog-to-digital converter (ADC) 134, a timing loop module 136, a digital filter 138, a clock 140, a digital detector 142, an RRO write module 144, and an analog write module 146.

The analog filter 132 filters analog read data received from the HDA 101 via the preamplifier 108. The ADC 134 receives filtered analog read data and samples the data according to a predetermined sampling rate derived from the clock 140. The output of the ADC 134 is used as feedback to control the timing of digital phase processing through the timing loop module 136. The digital filter 138 filters the data from the ADC 134. The digital detector 142 receives the digital data from the digital filter 138 and processes the data into a sequence of ones and zeroes. In one implementation, the digital detector 142 may include a Viterbi decoder.

Prior to an initial RRO write, the clock 140 locks the preamble field 22, SSM 24, Track/Sector ID FIELD 26, and PES FIELD 28 fields (hereinafter "original wedge") of the read data to a clock waveform. This locking is performed in response to signals from the timing loop module 136. The RRO write module 144 and the analog write module 146 write an initial RRO field based on the clock waveform.

Figure 4A:
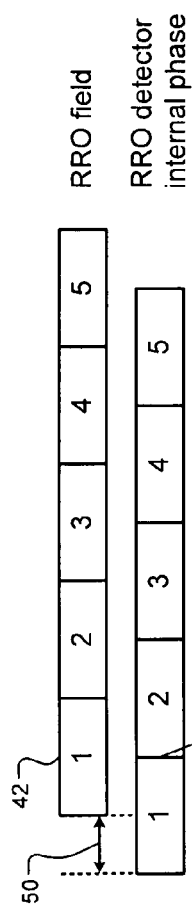
FIG. 4A illustrates an RRO field detection scenario where the RRO detector is out of phase with incoming data according to the prior art.
Figure 4B:
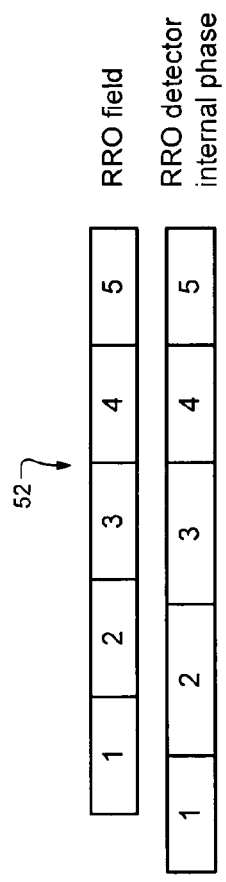
FIG. 4B illustrates an RRO field detection scenario where the RRO detector removes phase offset according to the prior art.
Figure 4C:
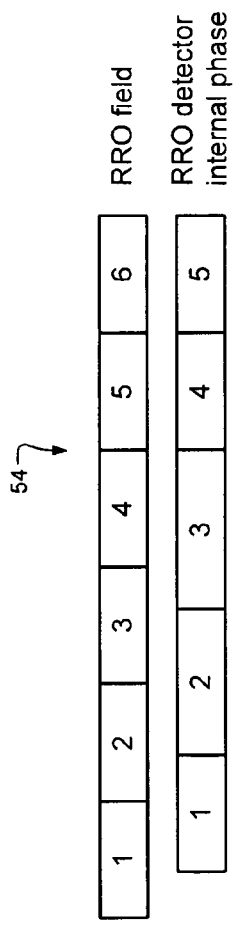
FIG. 4C illustrates an RRO field detection scenario where the RRO detector removes phase offset but positional offset is still present according to the prior art.
Figure 5:
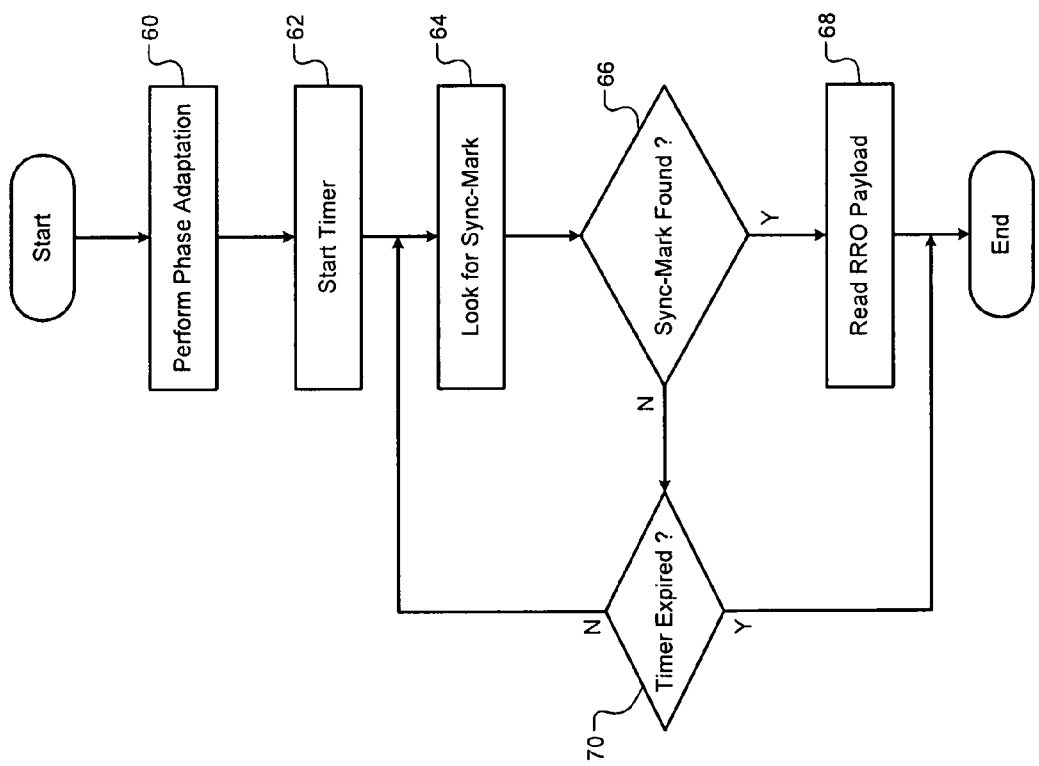
FIG. 5 is a flow diagram illustrating steps performed in removing phase offset and positional offset according to the prior art.

Due to latencies in the system, the written RRO field may be phase-offset from the original wedge, which may result in phase-offset reading as described above in connection with FIG. 4A. The HDC module 110 adjusts the clock 140 with a phase adjust signal so that RRO data will be written in phase with the original wedge. The digital detector 142 will then be in phase with the RRO data during reading. Further information related to phase adjustment may be found in commonly-assigned U.S. application Ser. No. 11/541,994, filed on Oct. 2, 2006, and entitled "Synchronous RRO Write," the disclosure of which is incorporated herein by reference in its entirety.

The HDC module 110 may write a non-repetitive phase-adjusted pattern to a given location in the HDA 101 via the preamplifier 108. A read is then performed, and the data read is compared to the non-repetitive pattern. The offset between the location where the data read occurs in the non-repetitive pattern and the expected location within the non-repetitive pattern determines the position offset.

Alternatively, the HDC module 110 may write a pattern similar to a servo RRO field to a given location in the HDA 101 via the preamplifier 108. The HDC module 110 then performs an RROSM seek, and the location of the RROSM is determined. The offset between the location where the RROSM is detected and the expected location of the RROSM determines the position offset.

The HDC module 110 can then output a position adjust signal, based on the position offset, to the RRO write module 144 for position-adjusted writing. The RRO write module can then write actual RRO data to the HDA 101, which may partially or completely overwrite the previously-written non-repetitive pattern.

Figure 7B:
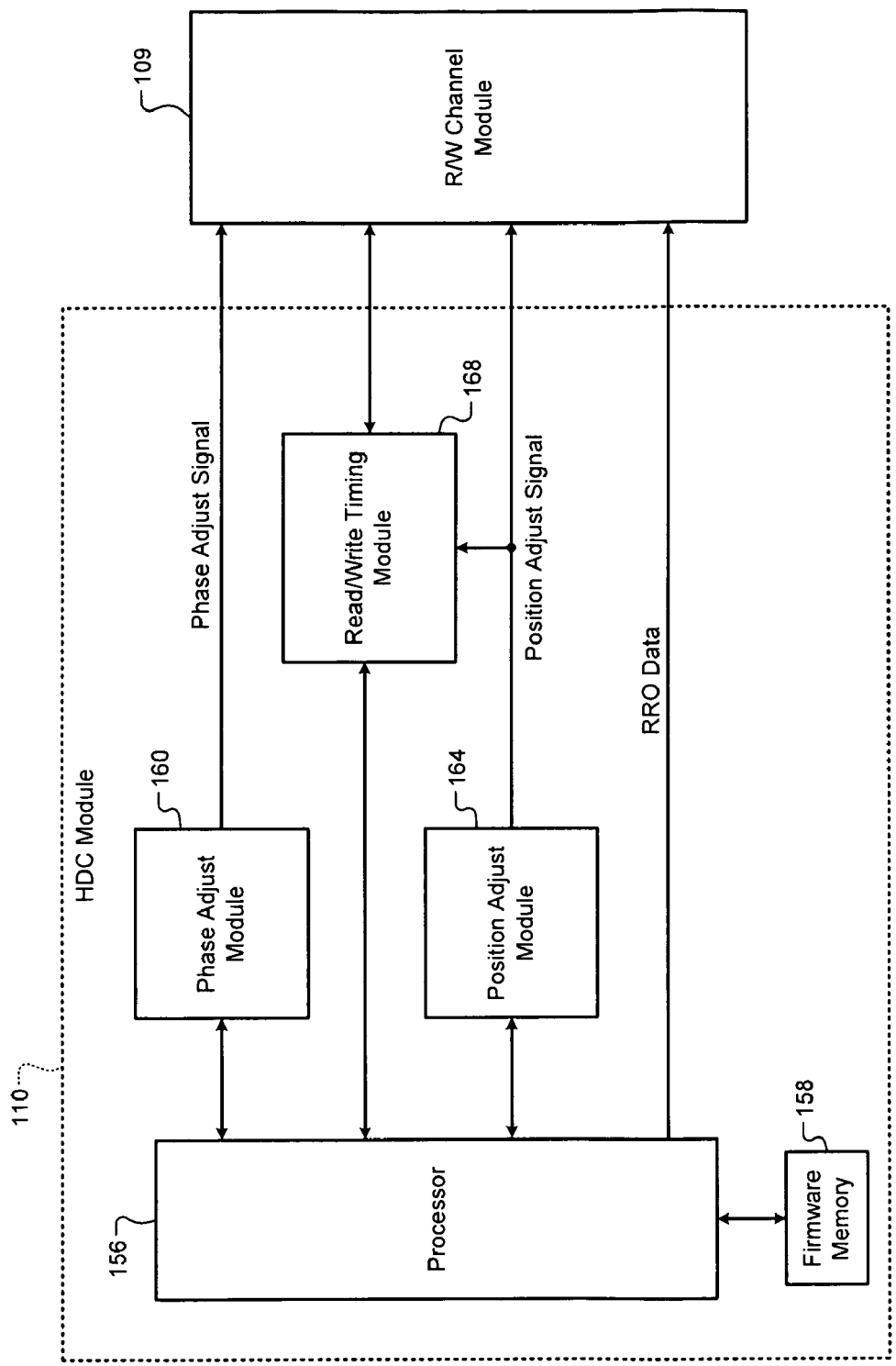
FIG. 7B is a functional block diagram of the HDC module according to one implementation of the present disclosure.

FIG. 7B shows one implementation of the HDC module 110. The HDC module 110 includes a processor 156, firmware memory 158, a phase adjust module 160, a position adjust module 164, and a read/write timing module 168. The processor 156 may execute commands from the firmware memory 158, which may be implemented as nonvolatile memory. In one implementation, the phase adjust module 160, the position adjust module 164, and the read/write timing module 168 may be implemented as software modules in the firmware memory 158.

In one implementation, the phase adjust module 160 generates the phase adjust signal that the R/W channel module 109 uses to perform the phase-adjusted RRO write. The phase adjust module 160 may generate the phase adjust signal based on the RRO field written with the initial RRO write and the original wedge. The phase adjust module 160 calculates phase adjustment values based on a comparison of phase error data of the RRO field with that of the original wedge. The phase adjust module 160 may obtain phase error information from the R/W channel module 109. This phase error information may be obtained using signal processing, such as a discrete Fourier transform (DFT).

The phase adjust signal may alter timing of the clock 140 of the R/W channel module 109 in order to write phase-adjusted data to the HDA 101. User bit boundaries of the written data will be aligned with those of the digital detector 142. A phase-adjusted RRO write results in phase alignment during detection, but does not necessarily result in position alignment. As such, the RROSM 34 may be used to locate the position of the RRO data payload 35 after a phase-adjusted RRO write.

However, the HDC module 110 may implement position adjustment to allow the RROSM to be eliminated. The actual RRO data may be written to a position-adjusted location so that reading will naturally occur at that location. Alternatively, the actual RRO data may be written without position adjustment, while the data determined from position adjustment can be used to offset the position of reading the RRO data. In one implementation, partial position adjustment may be performed when both reading and writing, the partial position adjustments resulting cumulatively in full position adjustment.

The position adjust module 164 determines, stores, and outputs a position offset used to write position-adjusted data. The position offset may be determined by writing a non-repeating calibration pattern to the magnetic medium 103. A read is then performed, and the data read is compared to the calibration pattern. The difference between the locations within the calibration pattern of the data read and expected data is the position offset. The position adjust module 164 outputs this offset to the RRO write module 144, which can then write actual RRO data in a position-adjusted manner to the magnetic medium 103. The calibration pattern may be transmitted from the processor 156 to the RRO write module 144 as RRO data.

Figure 8:
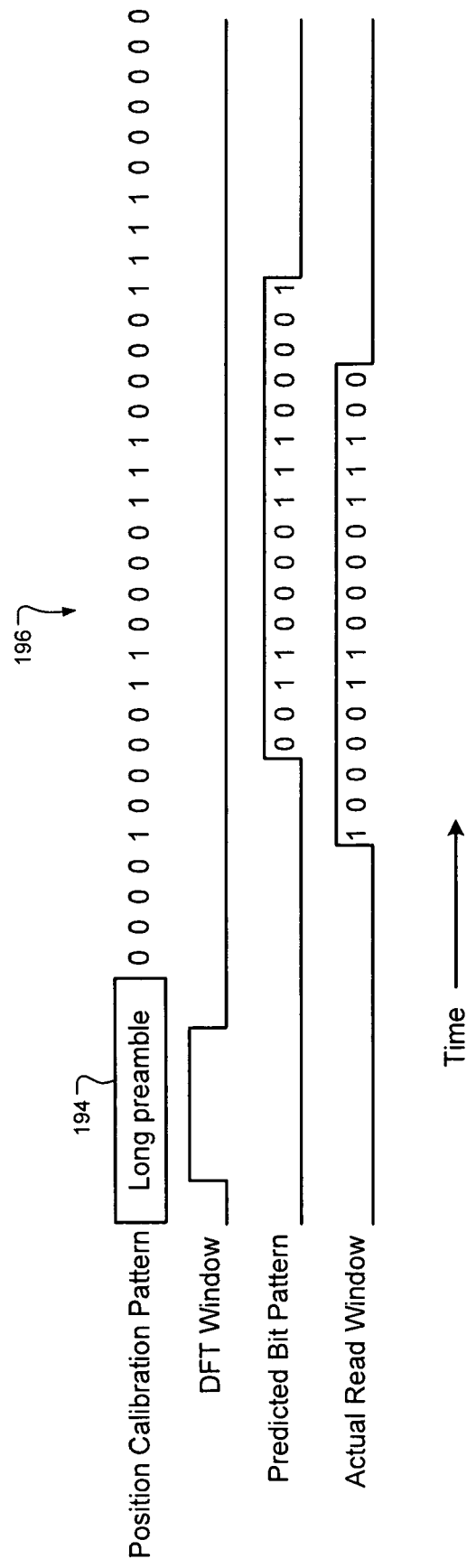
FIG. 8 illustrates a calibration pattern used for removing position offset according to one implementation of the present disclosure.

FIG. 8 shows one implementation of a calibration pattern. The calibration pattern includes a long preamble 194 and a long non-repetitive bit pattern 196. The position adjust module 164 (FIG. 7) outputs the calibration pattern, which is written in a phase-adjusted manner to the magnetic medium 103. The position adjust module 164 then begins reading the calibration pattern.

The phase adjust module 160 may sample the long preamble 194 during the DFT window to confirm the quality of phase adjustment. The phase offset determined should be minimal. If not, an error signal may be generated. The phase adjust module 160 may instruct the position adjust module 164 to attempt writing the calibration pattern again.

Assuming that phase offset is minimal, the position adjust module 164 detects a window of bits, which may be N bits long, of the non-repetitive bit pattern 196. For example only, N may be 16. The position adjust module 164 compares the windowed portion of the non-repetitive bit pattern 196 to the non-repetitive bit pattern 196 to determine a position value that locates the windowed portion within the non-repetitive bit pattern 196. The position offset is determined by comparing the first position value to a predicted position value.

For example, in FIG. 8, the predicted position value is 8 user bits from the long preamble 194, leading to a predicted bit pattern of 0011_0000_1110_0001. The received bit pattern is 1000_0110_0001_1100, which corresponds to 5 user bits from the long preamble 194. The position adjust module 164 may calculate the position offset as 5-8, or −3 bits. The offset of −3 bits may then be provided to the RRO write module 144 for position-adjusted writing of actual RRO data.

Figure 9A:
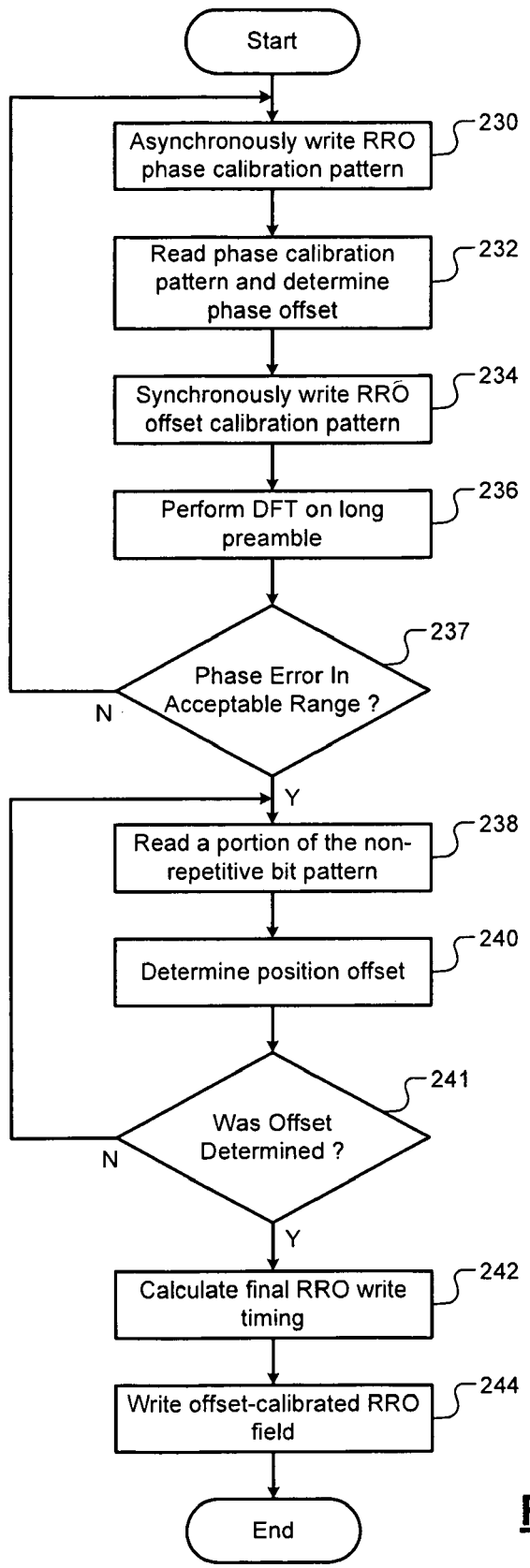
FIG. 9A is a flow diagram illustrating a position-adjusted writing method according to one implementation of the present disclosure.

FIG. 9A shows one implementation of a position-adjusted writing method. Control starts in step 230, where a phase calibration pattern is written. Control continues in step 232, where the phase calibration pattern is read and a phase offset is determined. Control continues in step 234, where a position calibration pattern is synchronously written to the magnetic medium. The term synchronous means in phase with the servo wedge, where phase adjustment is achieved using the phase offset. The position calibration pattern may include a long preamble and a long non-repetitive bit pattern.

Control continues in step 236, where signal processing, such as a DFT, is performed on data detected from the long preamble. The phase offset is determined based on the result of this signal processing. The phase offset should be minimal, as the position calibration pattern was written using the phase offset. Control continues in step 237, where if the phase error is within an acceptable range, control continues in step 238; otherwise, control returns to step 230.

In step 238, a portion of the non-repetitive bit pattern is read. Control continues in step 240, where determination of a position offset is attempted. Control continues in step 241, where if the position offset was determined, control continues in step 242; otherwise, control returns to step 238. In step 242, the timing for writing the position calibrated RRO field is determined (e.g., by the read/write timing module 168) based on system timing information and the position offset. In step 244, the actual RRO field is written to the disk medium.

Figure 9C:
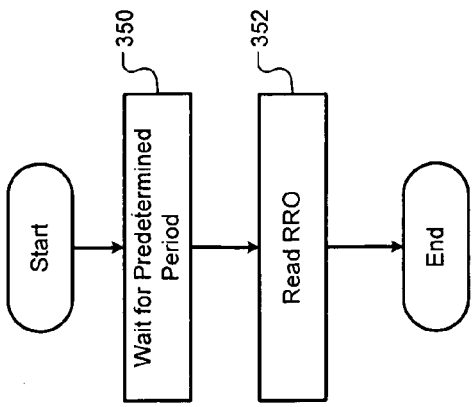
FIG. 9C is a flow diagram illustrating a position-adjusted reading method according to one implementation of the present disclosure.
Figure 9B:
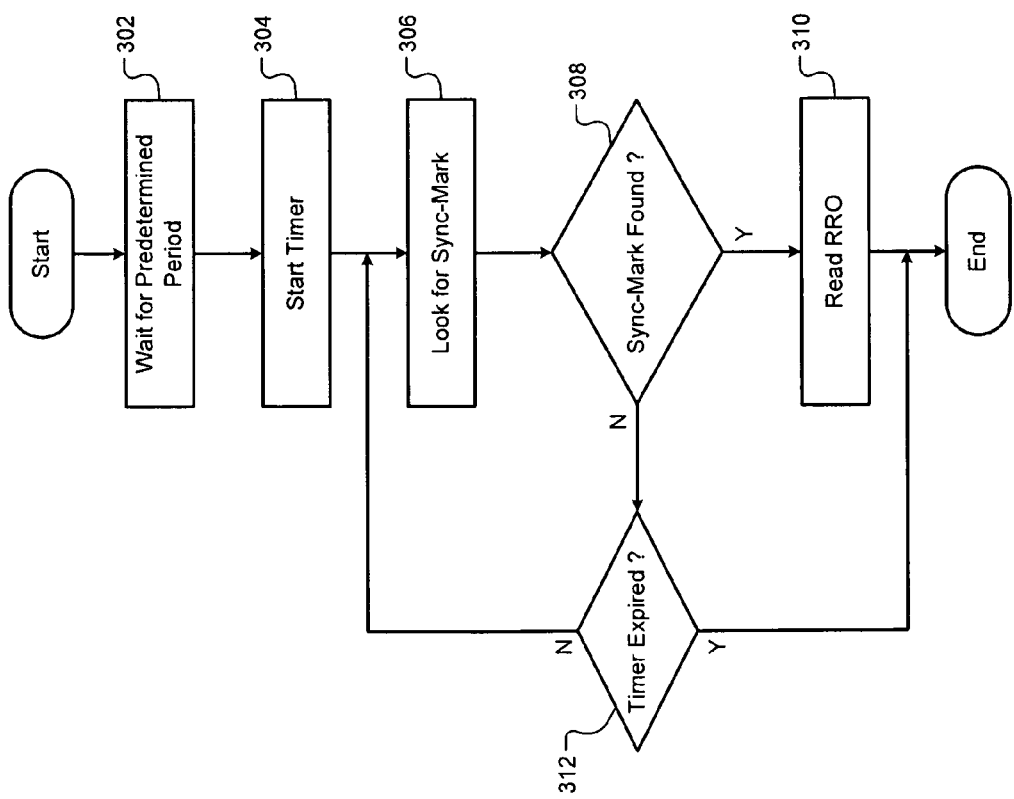
FIG. 9B is a flow diagram illustrating a phase-adjusted reading method, where the RROSM is present, according to one implementation of the present disclosure.

FIG. 9B shows one implementation of a phase-adjusted reading method, where the RROSM is present. Control begins in step 302, where control waits for a predetermined period of time. This predetermined period of time may correspond to the time necessary for the digital decoder to reach a known state, and may be measured in terms of channel bits. Control continues in step 304, where a timer is started. Control continues in step 306, where control begins looking for the RROSM.

Control continues in step 308, where if the RROSM has been found, control transfers to step 310; otherwise, control transfers to step 312. In step 310, control reads the RRO data, which may immediately follow the end of the RROSM. Control then ends. In step 312, control determines whether the timer has expired. If so, control ends; otherwise, control returns to step 306 to continue looking for the RROSM.

FIG. 9C shows one implementation of a position-adjusted reading method. RRO data written according to a method such as FIG. 9A is position-adjusted, and therefore also phase-adjusted. Control begins in step 350, where control waits for a predetermined period of time. This predetermined period of time may correspond to the time necessary for the digital decoder to reach a known state and to output the last padding bit before the first data bit of the RRO payload. During this time, the digital decoder is outputting padding bits located before the RRO payload.

Control continues in step 352, where control reads the RRO data, which has been written to the correct position-adjusted location by a method such as that of FIG. 9A. Alternatively, the position offset may be applied to the reading of step 352. Upon reading the RRO data, control ends.

FIG. 10A shows one implementation of an RRO field 402 for use with a position-adjusted system. The RRO field 402 may include the following fields: pre-padding 404, RRO data payload 406, and post-padding 408. The pre-padding 404 is used to bring the digital detector 142 into a known state prior to detection of the RRO data payload 406.

The pre-padding 404 may correspond to the greater of the number of previous bits that affect the current bit through intersymbol interference and the number of user bits required to bring the digital detector 142 to a known deterministic state. For example only, the pre-padding 404 may be three or more bits long. The RRO data payload 406 and post-padding 408 may respectively include the same data as the RRO data payload 35 and RRO pad 36 of FIG. 1.

FIG. 10B shows the latency of the digital detector 142 as it reads an RRO field 450. The latency is represented as time difference d. The RRO field 450 may include pre-padding 454, the RRO data payload 406, and post-padding 408. The time t at which the MSB of the RRO data payload 406 is available is labeled as time t.

Time t can be determined, and the latency d of the digital detector 142 may be fixed. The latency d of the digital detector 142 may be characterized at design time. If a known value is written to pre-padding 454, and the time at which the pre-padding 454 is reached can be determined, the digital detector 142 may be forced to that known value at the determined time. For example, the pre-padding 454 may be a single bit, and the digital detector 142 may be initialized to the value of the single bit at time T=t−d.

The pre-padding 454 may be reduced in size compared to the pre-padding 404 of FIG. 10A. For example only, the pre-padding 454 may be one user bit, while the pre-padding 404 is three user bits. Since the pre-padding 454 is used to bring the digital detector 142 to a known state, the size of the pre-padding 454 may be reduced to the minimum number of bits (either user bits or channel bits) that affect the current bit through intersymbol interference.

FIG. 10C shows one implementation of a position-adjusted reading method with detector initialization forcing. Control begins in step 502, where control waits for a predetermined period of time, such as the time that the analog sample of the MSB of the RRO data payload 406 is available. This may be determined by subtracting the latency of the digital detector 142 (d) from the time at which the MSB is output by the digital detector 142 (t), to yield t−d.

Control continues in step 504, where the digital detector 142 is initialized to the value of the pre-padding 454. Control then waits for a deterministic period of time, which may be equal to the latency of the digital detector 142. Control continues in step 506, where the RRO data payload 406 is read. The predetermined period of time in step 504 may be less than the predetermined period of time of step 350 in FIG. 9C. In addition, the number of bits used in the pre-padding may be less for an RRO field used with the method of FIG. 10C than for an RRO field used with the method of FIG. 9C.

In general, the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A hard disk control system, comprising:
a phase adjust module to generate a phase adjust signal based on a phase difference between a first repeatable run out (RRO) field and a servo wedge field;
a position adjust module to:
output a calibration pattern to a storage medium based on the phase adjust signal;
receive at least a portion of the calibration pattern from the storage medium; and
determine an offset based on a comparison between the output calibration pattern and the received portion of the calibration pattern; and
a read/write timing module to determine a position to write a second RRO field on the storage medium based on the offset.

2. The hard disk control system of claim 1, wherein the read/write timing module reads the second RRO field at the position on the storage medium at which the second RRO field is written.

3. The hard disk control system of claim 2, wherein the read/write timing module reads the second RRO field at the position on the storage medium without use of an RRO sync mark (RROSM).

4. The hard disk control system of claim 1, wherein the calibration pattern comprises a preamble followed by a non-repetitive bit pattern.

5. The hard disk control system of claim 1, wherein the calibration pattern comprises a preamble followed by an RRO sync mark (RROSM).

6. The hard disk control system of claim 1, wherein the offset has a resolution of at least one of user bits and channel bits.

7. The hard disk control system of claim 1, wherein the position on the storage medium at which the second RRO field is written is based on an amplitude and angle data associated with the servo wedge field.

8. The hard disk control system of claim 1, wherein the second RRO field comprises at least one of a pre-padding field, an RRO data payload field, and an RRO pad field.

9. The hard disk control system of claim 1, further comprising a digital decoder to determine digital data from sampled analog values read from the storage medium, wherein the digital decoder is initialized to a known state at a predetermined time based on a reading time of the second RRO field.

10. The hard disk control system of claim 9, wherein the second RRO field includes a payload, a single pre-padding bit, and a single post-padding bit.

11. The hard disk control system of claim 9, wherein the second RRO field includes a payload beginning with a first bit, and wherein the predetermined time is determined based on a latency of the digital decoder and on a first time when the first bit is output from the digital decoder and on a delay.

12. The hard disk control system of claim 11, wherein the predetermined time is based on the first time minus the latency.

13. The hard disk control system of claim 1, wherein the position adjust module outputs the calibration pattern to the storage medium in phase with the servo wedge field.

14. A method for controlling a hard drive system, comprising:
generating a phase adjust signal based on a phase difference between a first repeatable run out (RRO) field and a servo wedge field;
outputting a calibration pattern to a storage medium based on the phase adjust signal;
receiving at least a portion of the calibration pattern from the storage medium;
determining an offset based on a comparison of the calibration pattern to the received portion of the calibration pattern; and
determining an adjusted position at which to write a second RRO field on the storage medium based on the offset.

15. The method of claim 14, further comprising reading the second RRO field at the adjusted position.

16. The method of claim 15, further comprising reading the second RRO field at the adjusted position without use of an RRO sync mark (RROSM).

17. The method of claim 14, wherein the calibration pattern comprises a preamble followed by a non-repetitive bit pattern.

18. The method of claim 14, wherein the calibration pattern comprises a preamble followed by an RRO sync mark (RROSM).

19. The method of claim 14, wherein the offset has a resolution of at least one of user bits and channel bits.

20. The method of claim 14, further comprising determining the adjusted position based on amplitude and angle data associated with the servo wedge field.

21. The method of claim 14, wherein the second RRO field comprises at least one of a pre-padding field, an RRO data payload field, and a padding field.

22. The method of claim 14, further comprising:
    determining digital data from sampled analog values read from the storage medium; and
    initializing the digital data determining to a known state at a predetermined time based on a reading time of the second RRO field.

23. The method of claim 22, wherein the second RRO field includes a payload and a single pre-padding bit.

24. The method of claim 23, wherein the second RRO field includes a payload, a single pre-padding bit, and a single post-padding bit.

25. The method of claim 22, wherein the second RRO field includes a payload beginning with a first bit, and wherein the predetermined time is determined based on a latency of the digital data determining and on a first time when the first bit is output from the digital data determining.

26. The method of claim 25, wherein the predetermined time is based on the first time minus the latency.

27. The method of claim 14, further comprising outputting the calibration pattern to the storage medium in phase with the servo wedge field.

* * * * *